(12) United States Patent
Setton

(10) Patent No.: US 8,982,175 B2
(45) Date of Patent: Mar. 17, 2015

(54) INTEGRATING A VIDEO WITH AN INTERACTIVE ACTIVITY

(71) Applicant: TangoMe, Inc., Palo Alto, CA (US)

(72) Inventor: Eric Setton, Menlo Park, CA (US)

(73) Assignee: TangoMe, Inc., Mountain View, CA (US)

( * ) Notice: Subject to any disclaimer, the term of this patent is extended or adjusted under 35 U.S.C. 154(b) by 278 days.

(21) Appl. No.: 13/631,386

(22) Filed: Sep. 28, 2012

(65) Prior Publication Data

US 2014/0092198 A1    Apr. 3, 2014

(51) Int. Cl.
*H04N 7/14* (2006.01)

(52) U.S. Cl.
USPC ........................................ 348/14.07; 715/733

(58) Field of Classification Search
CPC . A63F 13/12; A63F 2300/8082; A63F 13/06; A63F 2300/69; G06F 3/04815; G06F 3/011; G06F 1/1605; G06F 3/0481; H04L 67/22; H04L 67/34; G06T 19/006; G06T 15/20; G06T 19/00; H04N 21/4316
USPC ...................... 348/14.01–14.1; 345/633, 427; 715/757, 733
See application file for complete search history.

(56) References Cited

U.S. PATENT DOCUMENTS

| | | | |
|---|---|---|---|
| 7,441,199 B2 | 10/2008 | Zenith | |
| 8,125,510 B2 * | 2/2012 | Agarwal et al. | 348/14.08 |
| 8,246,454 B2 | 8/2012 | Zalewski | |
| 8,291,327 B2 * | 10/2012 | Bates et al. | 715/757 |
| 8,539,364 B2 * | 9/2013 | Hamilton et al. | 715/757 |
| 8,671,349 B2 | 3/2014 | Hamilton et al. | |
| 2002/0158873 A1 * | 10/2002 | Williamson | 345/427 |
| 2006/0130109 A1 | 6/2006 | Zenith | |
| 2008/0184124 A1 * | 7/2008 | Agarwal et al. | 715/733 |
| 2009/0288002 A1 * | 11/2009 | Hamilton et al. | 715/706 |
| 2010/0180215 A1 * | 7/2010 | Bates et al. | 715/757 |
| 2010/0273553 A1 | 10/2010 | Zalewski | |
| 2012/0050325 A1 * | 3/2012 | Joo et al. | 345/633 |
| 2013/0263017 A1 * | 10/2013 | Moyers et al. | 715/753 |
| 2014/0026064 A1 * | 1/2014 | Dawson et al. | 715/743 |

FOREIGN PATENT DOCUMENTS

| | | |
|---|---|---|
| EP | 2136531 A1 | 12/2009 |
| WO | 01/20466 | 3/2001 |

OTHER PUBLICATIONS

"PCT/US2013/061771 International Search Report and Written Opinion", Jan. 22, 2014, 10 pages.

\* cited by examiner

*Primary Examiner* — Olisa Anwah

(57) ABSTRACT

A method for sending a video ringtone. The method includes: integrating a received first video of a first location with an interactive activity, wherein the interactive activity includes an activity in which a first entity at the first location and a second entity at a second location are engaged over a telecommunications network, wherein the integrating the received first video of the first location with the interactive activity achieves an integrated interactive activity.

6 Claims, 3 Drawing Sheets

INTEGRATING A VIDEO WITH AN INTERACTIVE ACTIVITY

BACKGROUND

In general, two or more people may engage in a common task over a telecommunications network. For example, a person telecommuting from home may revise a document while his colleagues at the office watch the revisions take place. Further, the colleagues may also make revisions. However, limitations exist with respect to actively collaborating over a network.

The drawings referred to in this description should be understood as not being drawn to scale except if specifically noted.

DESCRIPTION OF EMBODIMENTS

Various embodiments are described below, with reference to detailed illustrative embodiments, in the context of device for integrating a video with an interactive activity. It will be apparent from the description provided herein that the systems, apparatuses and methods can be embodied in a wide variety of forms. Consequently, the specific structural and functional details disclosed herein are representative and do not limit the scope of embodiments of the present technology.

Example devices and methods for integrating a video with an interactive activity engaged in by two or more people over a telecommunications network achieve an integrated interactive activity are described herein.

In particular, the following discussion will first describe the structure and components of the device. Then the discussion will describe the functionality of the structure and components of the device during use of the device.

Various embodiments describe a structure and method for two or more people to engage in a common tack over a telecommunication network while being able to look both the task and each other. Embodiments may be used in activities such as, but not limited to, document revision and gaming.

Figure 1:
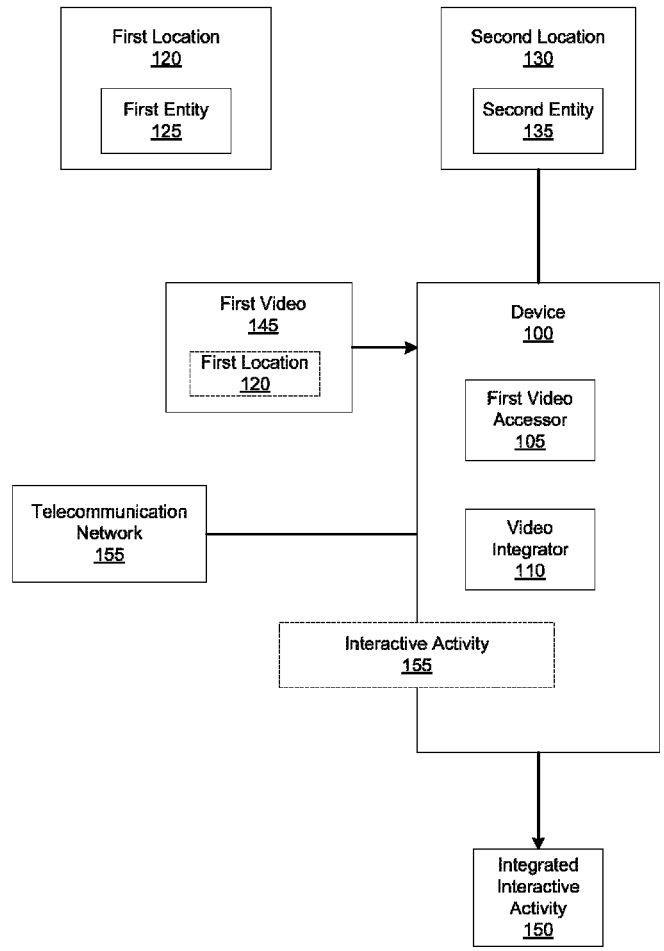
FIG. 1 is a block diagram illustrating an example device, in accordance with an embodiment.

FIG. 1 shows a block diagram illustrating a device 100, according to an embodiment. In one embodiment, the device 100 includes a first video accessor 105 coupled with a video integrator 110.

The first video accessor 105, in one embodiment, accesses a first video 145 of a first location 120. In one embodiment, the video integrator 110 integrated the first video 145 with an interactive activity 115. The interactive activity 115 is an activity in which a first entity 125 at the first location 120 and a second entity 135 at a second location 130 are engaged over a telecommunications network 155, wherein the integrating of the first video 145 with the interactive activity 115 achieves an integrated interactive activity 150.

Of note, in one embodiment, the first and second entities, 125 and 135, respectively, are people located at the first and second locations, 120 and 130, respectively. However, the first and second entities, 125 and 135, respectively, may a live being other than a human and/or inanimate objects located at the first and second locations, 120 and 130, respectively.

The first video 145 includes a set of images of the first location 120, which also includes the first entity (e.g., person) at the first location 120. While, the second video 275 (of FIG. 2) includes a set of images of the second location 130, which also includes the second entity 135 (e.g., person) at the second location 130. The set of images are a stream of images constituting a video. In one embodiment, the stream of images, for example, of the first video 145 are recorded by a camera at a speed that corresponds to a predetermined speed of play of the interactive activity. For example, if the speed of play of the interactive activity is paused, the camera may be configured to operate such that it also pauses until the interactive activity resumes. However, in another embodiment, the camera may be configured to operate such that when the interactive activity is paused, the camera continues to record the first and second locations, 125 and 130, respectively.

Figure 2:
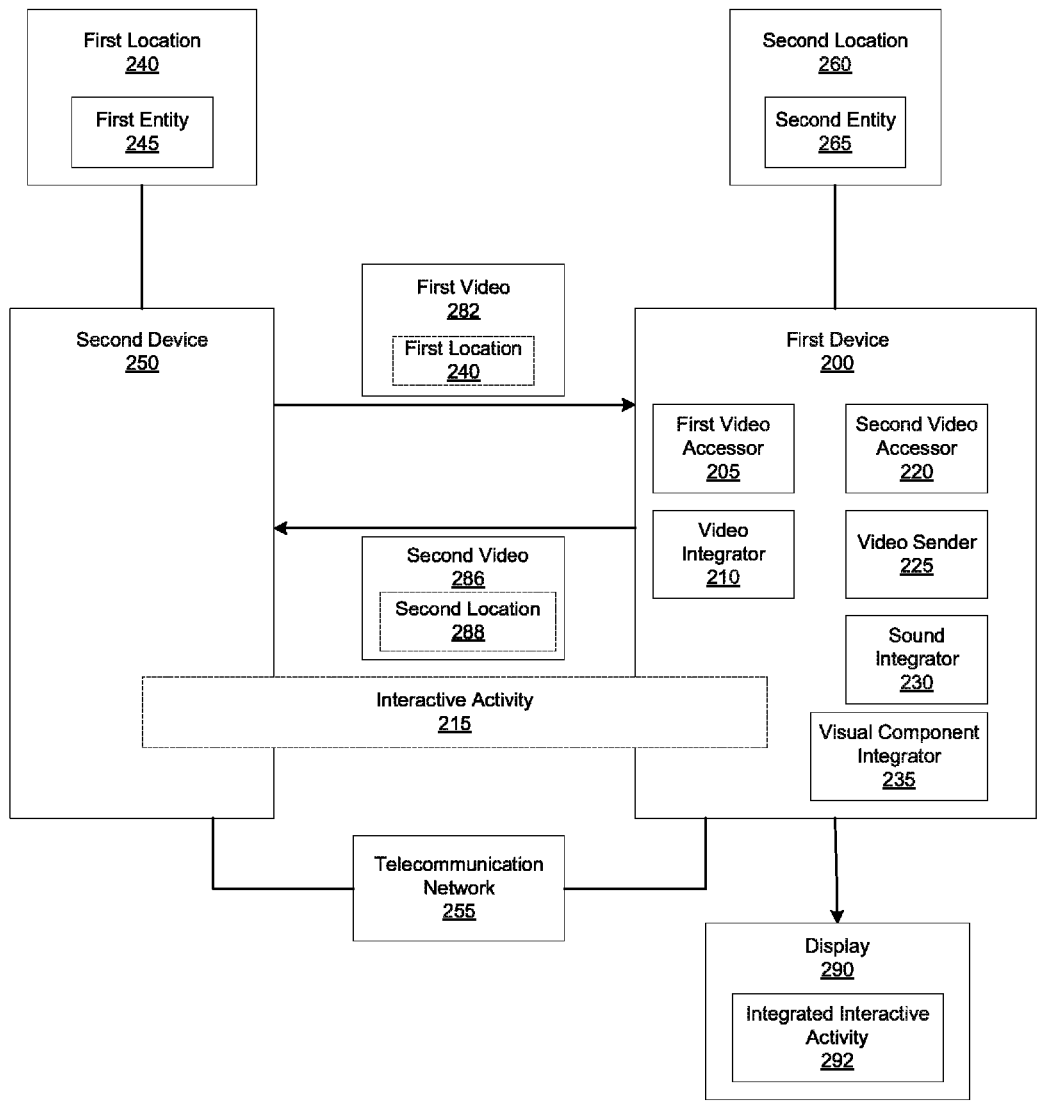
FIG. 2 is a block diagram illustrating an example device, in accordance with an embodiment.

FIG. 2 shows a block diagram illustrating a first device 200 and a second device 250, according to an embodiment. The first and second devices, 200 and 250, respectively, in various embodiments, are any such devices that are or are part of a device capable of facilitating communication over a network, for example, but not limited to, a mobile telecommunication device, a personal digital assistant, a laptop, etc.

In one embodiment, the first device 200 includes a first video accessor 205 coupled with a video integrator 210. The first device 200 may optionally include one or more of the following components: a second video accessor 220; a video sender 225; a sound integrator 230; and a visual component integrator 235.

Further, FIG. 2 also shows first device 200 coupled with a second location 260 (including a second entity 265). In one embodiment, the first device 200 may optionally be coupled with (via wire and/or wirelessly) one or more of the following devices: a camera 270; and a display 290. The second device 250 is shown coupled with the first location 240 (including the first entity 245). The first device 200 and the second device 250 are coupled with each other through a telecommunications network 255, via wire and/or wirelessly.

In one embodiment, the display 290 displays the integrated activity 292. In another embodiment, the sound integrator 230 integrates sound accompanying an audio component of the first video 282. In yet another embodiment, the visual component integrator 235 integrates a visual component of the first video 282. Thus, the audio and visual components of the first video 282 may be integrated separately, according to predetermined instructions for the first entity 245, the second entity 265, manufacturer's instructions, or any other entity. For example, the sound of the audio component may be predetermined to be muted during the playing of the video. This muted function can be, but is not limited to being, directed by the first entity 245 engaged in the interactive activity 215, or by the second entity 265 engaged in the interactive activity. Further, the visual component may be directed to be played at different speeds not coinciding with the functioning of the interactive activity.

In one embodiment, the second video accessor 220 accesses a second video 275 of a second location 260. For example, in one embodiment, the camera 270 videotapes the second entity 265 at the second location 260. The first device 200 then accesses the second video 275, via wire and/or wirelessly.

In one embodiment, the video sender 225 sends the second video 275 to another device, such as, but not limited to, the second device 250. Of note, while just two devices are shown here engaged in the interactive activity 215, more than two devices may be engaged as such.

It should be appreciated that the first device, in one embodiment, the second device 250 also includes a first video accessor and video integrator, and optionally, one or more of: a second video accessor; a video sender; a sound integrator; and a visual component integrator. Further, the second device 250, in one embodiment, functions similarly to the functioning described herein with regards to the first device 200. Thus, the first device 200 and the second device 250 may engage in a common task in real time, such as playing checkers over a telecommunication network, while also seeing each other's images (and expressions) in real time.

Figure 3:
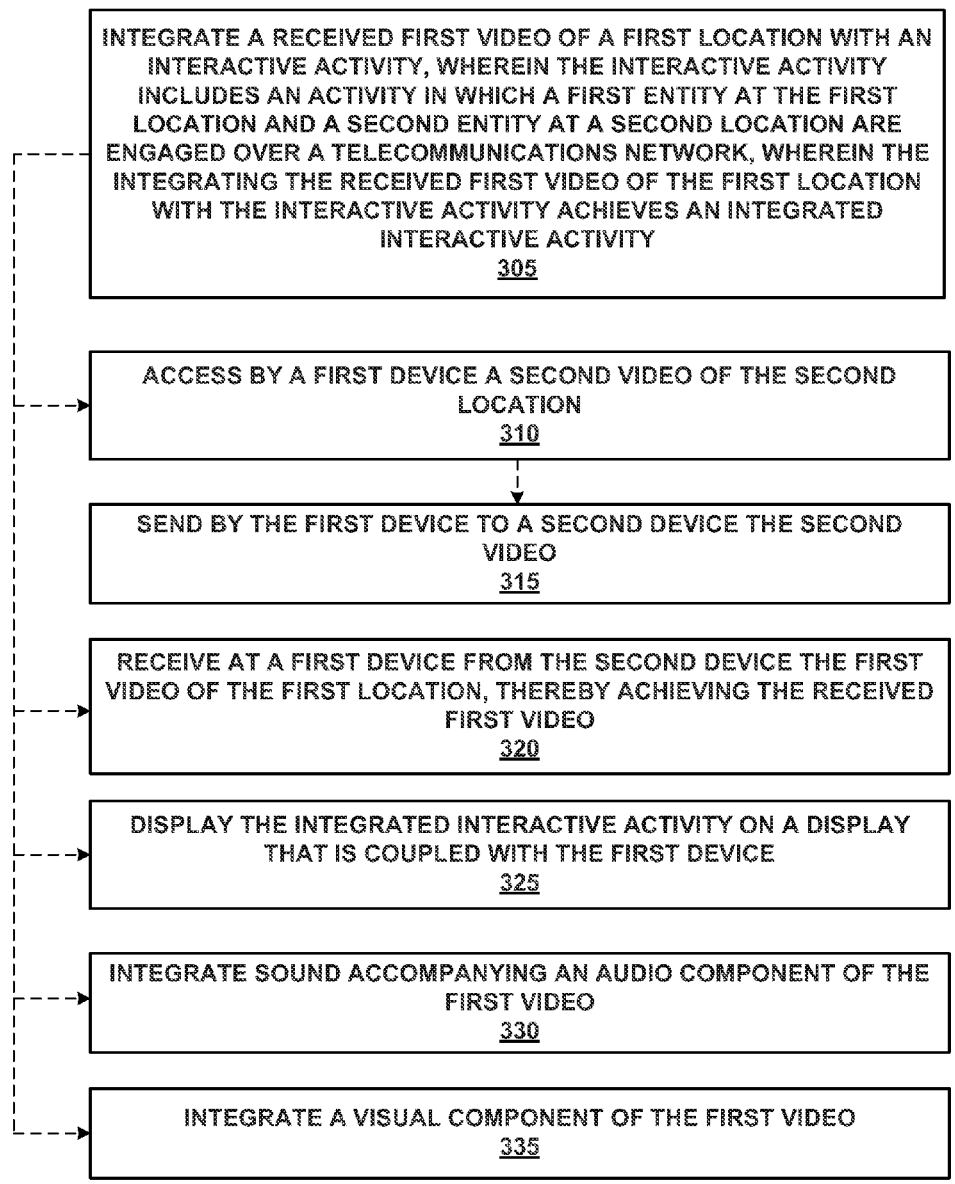
FIG. 3 is a flow diagram illustrating an example method, in accordance with an embodiment.

The discussion will now describe the functionality of the structure and components of the first device 200 during use of the first device 200, according to an embodiment. In particular, the discussion will describe integrating a received first video 282 with the interactive activity 215. The discussion will refer to FIGS. 1-3. FIG. 3 is a flow diagram illustrating an example method 300. In various embodiments, method 300 is carried out by processors and electrical components under the control of computer readable and computer executable instructions. The computer readable and computer executable instructions reside, for example, in a non-transitory data storage medium such as computer usable volatile and non-volatile memory. However, the computer readable and computer executable instructions may reside in any type of computer readable storage medium. In some embodiments, method 300 is performed by components in the first device 200, as described in FIGS. 1 and 2.

At operation 305 and as described herein, in one embodiment, a received first video 282 of the first location 240 is integrated with an interactive activity 215, wherein the interactive activity 215 includes an activity in which a first entity 245 at the first location 240 and a second entity 265 at the second location 260 are engaged over the telecommunications network 255. The integrating of 305 of the received first video 282 of the first location 240 with the interactive activity 215 achieves an integrated interactive activity 292.

At operation 310 and as described herein, in one embodiment, the second video 275 of the second location 260 is accessed by the first device 200. Then, at operation 315 and as described herein, in one embodiment, the second video 275 is sent by the first device 200 to the second device 250.

At operation 320 and as described herein, in one embodiment, the first video 282 of the first location 240 is received at the first device 200, from the second device 250, thereby achieving the received first video of operation 305.

At operation 325 and as described herein, in one embodiment, the integrated interactive activity 292 is displayed on a display 290 coupled with the first device 200.

At operation 330 and as described herein, in one embodiment, the sound accompanying an audio component of the first video 282 is integrated with the interactive activity 215.

At operation 335 and as described herein, in one embodiment, a visual component of the first video 282 is integrated with the interactive activity 215.

Thus, as described herein, embodiments enable two or more people to engage in a common activity while also seeing each other's image during the performance of the activity.

Various embodiments of the present invention are thus described. While embodiments have been described in particular embodiments, it should be appreciated that embodiments should not be construed as limited to such description, but rather construed according to the following claims.

I claim:
1. A computer-implemented method comprising:
receiving at a first device from a second device a first video of a first location, thereby achieving a received first video;
accessing by said first device a second video of a second location;
integrating, in real time, said received first video of said first location with an interactive activity, wherein said interactive activity comprises an activity in which a first entity at said first location and a second entity at said second location are engaged over a telecommunications network, wherein said integrating said received first video of said first location with said interactive activity achieves an integrated interactive activity, wherein said received first video includes a first set of images of said first location and at least facial expressions of said first entity at said first location,
wherein said second video includes a second set of images of said second location and at least facial expressions of said second entity at said second location, wherein said first and said second set of images comprise a first and second stream of images constituting said received first video and said second video, respectively, wherein said first and said second stream of images are recorded by a first camera and a second camera, respectively, at a predetermined speed of play of said interactive activity or at a predetermined speed of play independent of said interactive activity, such that when said interactivity is paused, said first and said second stream of images are also paused,
wherein said integrating, in real time, said received first video of said first location with said interactive activity comprises:
integrating a visual component of said received first video; and
integrating sound accompanying an audio component of said accessed first video, wherein said visual component and said audio component are integrated independently of each other, according to predetermined integration instructions.
2. The computer-implemented method of claim 1, further comprising:
sending by said first device to said second device said accessed second video.
3. The computer-implemented method of claim 1,
further comprising:
displaying said integrated interactive activity on a display that is coupled with said first device.
4. A device comprising:
a first video accessor configured for accessing a first video of a first location to achieve an accessed first video;
a second video accessor configured for accessing a second video of a second location to achieve an accessed second video; and
a video integrator coupled with said first video accessor, said video integrator configured for integrating, in real time, said accessed first video with an interactive activity, wherein said interactive activity comprises an activity in which a first entity at said first location and a second entity at said second location are engaged over a telecommunications network, wherein said integrating said first video with said interactive activity achieves an integrated interactive activity, wherein said accessed first video includes a first set of images of said first location and at least facial expressions of said first entity at said first location, wherein said accessed second video includes a second set of images of said second location and at least facial expressions of said second entity at said second location, wherein said first and said second set of images comprise a first and second stream of images constituting said accessed first video and said accessed second video, respectively, wherein said first and said second stream of images are recorded by a first camera and a second camera, respectively, at a predetermined speed of play of said interactive activity or at a predetermined speed of play independent of said interactive activity, such that when said interactivity is paused, said first and said second stream of images are also paused, wherein said video integrator comprises:
- a visual component integrator configured for integrating a visual component of said accessed first video; and
- a sound integrator configured for integrating sound accompanying an audio component of said accessed first video, wherein said visual component and said audio component are integrated independently of each other, according to predetermined integration instructions.

5. The device of claim 4, further comprising:
a video sender configured for sending said accessed second video to second device.

6. The device of claim 4, further comprising:
a display configured for displaying said integrated interactive activity.

* * * * *